(12) United States Patent
Hottebart et al.

(10) Patent No.: US 7,079,018 B2
(45) Date of Patent: Jul. 18, 2006

(54) SYSTEM STATE INDICATOR

(75) Inventors: Francois Hottebart, Royat (FR); Russel Shepherd, Perignat-les-Sarlieves (FR); Thierry Bouiges, Gif-sur-Yvette (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/965,934

(22) Filed: Oct. 18, 2004

(65) Prior Publication Data

US 2005/0134443 A1 Jun. 23, 2005

Related U.S. Application Data

(63) Continuation of application No. PCT/EP03/03920, filed on Apr. 15, 2003.

(30) Foreign Application Priority Data

Apr. 18, 2002 (FR) .................................. 02 04965

(51) Int. Cl.
*G08B 21/00* (2006.01)

(52) U.S. Cl. ...................... 340/442; 340/449; 340/461; 116/34 B (58) Field of Classification Search ........ 340/442–449, 340/439–441, 450.2, 459, 461, 462; 73/146, 73/146.2, 146.3, 146.4, 146.5, 146.8; 116/34 R, 116/34 A, 34 B; 701/1–93; 151/152, 151

See application file for complete search history.

(56) References Cited

U.S. PATENT DOCUMENTS

| 5,539,399 | A | * | 7/1996 | Takahira et al. ....... 340/995.27 |
| 5,742,920 | A | * | 4/1998 | Cannuscio et al. ......... 701/102 |
| 5,916,298 | A |   | 6/1999 | Hugo et al. |
| 6,259,361 | B1 | * | 7/2001 | Robillard et al. ........... 340/447 |
| 6,382,018 | B1 | * | 5/2002 | Knestel .................... 73/118.1 |
| 6,809,637 | B1 | * | 10/2004 | Brown ....................... 340/443 |
| 2002/0032513 | A1 |   | 3/2002 | Ian |
| 2002/0069008 | A1 | * | 6/2002 | Nantz et al. .................. 701/93 |
| 2002/0138180 | A1 | * | 9/2002 | Hessing et al. ................ 701/1 |

FOREIGN PATENT DOCUMENTS

| CH | 685 727 | 9/1995 |
| EP | 0 672 892 | 4/1995 |
| WO | WO 02/07996 | 1/2002 |

* cited by examiner

*Primary Examiner*—Jeffery Hofsass
*Assistant Examiner*—Jennifer Mehmood
(74) *Attorney, Agent, or Firm*—Buchanan Ingersoll PC (57) ABSTRACT

System state indicator in particular for a vehicle dashboard, the system having a given use potential and comprising evaluation means such that, on the basis of measurements related to the conditions of use of the vehicle and/or the physical characteristics of the system and/or the vehicle and/or the vehicle environment conditions, the evaluation means calculate at a time t parameters characteristic of the state of the system, characterized in that the state indicator simultaneously displays at time t at least three different parameters characteristic of the state of the system and its range.

15 Claims, 13 Drawing Sheets

FUEL MODE

FIG. 4G

SERVICE MODE

SYSTEM STATE INDICATOR

The present application is a continuation of International Application Serial No. PCT/EP03/03920 filed Apr. 15, 2003 and which claims priority of patent application Ser. No. 02/04965 filed in France on Apr. 18, 2002.

BACKGROUND OF THE INVENTION

The present invention concerns the technical sector of vehicles provided with tires and on-board electronic systems which relate to them.

"Vehicles" will, throughout the present application, including the claims, mean both light vehicles (LV), such as private cars or vehicles, and utility vehicles or heavy vehicles such as lorries and "heavy goods vehicles" (HGVs), trailers, forestry vehicles, construction machinery, military or emergency vehicles, and the like.

The electronic systems on board vehicles are becoming more and more numerous and of higher and higher performance, and deliver more and more data for the driver.

Moreover there exist new technical developments for which a data display is not possible at the present time.

Naturally such systems must be understandable to all drivers, that is to say considering drivers who have no pre-established knowledge of the system in question. To achieve this objective (which is essential for selling the equipment in question), it is essential for the displays to be of such a nature that their meaning and information appear immediately to any driver, including in the case where an on-board system is used on very rarely, that is to say where a driver has no chance of memorizing its operating and display modes by a process of repetition.

Such is for example, and non-limitingly, the case with systems dealing with the phenomena of accidental pressure loss (APL) which may go as far as running flat, for vehicles equipped with tires. The system of APL and ultimately of running flat means, as a person skilled in the art knows, the running of the vehicle on at least one tire whose inflation pressure becomes or has become, for whatever reason, very much less than the pressure provided for by the manufacturer, that is to say the case of running where the inflation pressure drops abnormally with respect to the nominal use pressure, referred to as the service pressure, the inflation pressure even being able to become zero. The frequency of such incidents is very low and, if the displayed data is not immediately comprehensible, the driver may completely misunderstand the meaning of the data displayed and the changes therein, which may reduce the efficacy of the system to zero.

Another problem posed relates to the size of vehicle dashboards, as the number and sophistication of on-board systems increases. The available surface not being extendable, this parameter makes it necessary to develop indicating systems which are as compact as possible but which nevertheless display many data in a manner which is immediately understandable to any driver.

It would also be very advantageous, for the same reason, to develop an indicator which is capable of displaying several types of data in alternating mode whose display remains immediately comprehensible to any driver.

It would be even more advantageous for the system to provide the driver not only with instantaneous data but also recommendations on driving style aimed at deriving the best possible advantage from the on-board electronic system.

A person skilled in the art will have understood that the above criteria and objectives are to a major extent clearly contradictory, which greatly complicates any search for a technical solution.

Systems are known which are capable of displaying in alternating or successive mode (that is to say the driver makes several successive screens pass by, in general by means of a push button or the like) data relating for example to the average speed, the average fuel consumption, the driving time, the mileage possible having regard to the fuel reserve, etc.

However, these displays are of a very simple type since they are limited to a single value whose meaning may not escape the driver.

In addition they include no driving recommendation. Even in the systems capable of calculating the mileage possible according to the fuel reserve, it is the driver who must, very approximately, for example slow down if he wishes to increase his range. Another driving recommendation mode, which seems to have been abandoned, was the "econometer" with three LEDs (light-emitting diodes) which indicated in brief whether the driver was driving in a manner causing a "high" consumption, a "normal" or "low" consumption. Such a system was by nature extremely rudimentary and not very useful in practice.

Naturally display systems of all kinds are also known, such as a dial on which a needle moves (tachometer, voltmeter, water or oil temperature, etc), which also display only raw and very simple data whose meaning is immediate but which cannot give a driving recommendation to the driver, nor apply to complex on-board systems involving several parameters.

"System" for a motor vehicle will hereinafter mean a system (or vehicle component) of any type useful or necessary to the functioning and/or control of the vehicle, such as for example a fuel tank, a battery, tires, engine and the like, having a "potential for use" (which is for example at a time t the quantity of fuel present in the tank, the battery charging level, the thickness of rubber on the tire tread, the maximum potential for use of a flat running system, the quality of the lubricating oil in the driving components, in order to summarize the above non-limiting examples), and have at the same time t an "range in use" (which is, in order to repeat the non-limiting examples above, the range of the vehicle in km having regard to the fuel reserve, the useful life of the battery, for example in the event of breakdown of the alternator, the life of the tire according to the thickness of rubber remaining, the number of km which can be traveled before the next oil change, etc).

SUMMARY OF THE INVENTION

The present invention concerns a system state indicator in particular for a vehicle dashboard. The system has a given potential for use and comprises evaluation means such that, on the basis of measurements related to the conditions of use of the vehicle and/or the physical characteristics of the system and/or of the vehicle and/or to the vehicle environment conditions, these evaluation means calculate at a time t parameters characteristic of the state of the system. The state indicator according to the invention is characterized in that it displays simultaneously with the said time t at least three different parameters characteristic of the state of the system and its range.

These three parameters can be chosen from amongst range of use, the maximum and minimum values of the range of use, the potential for use and a quantity C related to, or representing, the severity of the parameters for use of the said system at the given time t.

According to a first embodiment of the state indicator, the evaluation means and the display calculate and display simultaneously:
- the potential for use of the said system at the given time t;
- the range of use of the said system at the said given time t; and
- a quantity C related to the severity of the parameters of use of the said system at the said given time t.

The display of the quantity C related to the severity of the conditions of use of the system, in addition to the potential of use and the range of use, enables the driver to know and follow a parameter which takes account of the influence of his driving on the state of the system. He can thus adapt his driving in order to obtain the range of use which is necessary to him.

Preferably, the potential as well as quantity C are displayed graphically. By way of example, the potential can be represented by an area A of a given color whose surface area represents its value. As this potential is consumed, the area A decreases.

The area A can thus be separated into two areas A1 and A2 whose respective surface areas are a function of the value of the quantity C.

The value of this quantity C can thus be added numerically.

According to a second embodiment, the evaluation and display means calculate and display simultaneously:
- the potential of use of the said system at the given time t; and
- the maximum and minimum possible values of the range of use of the said system at the said given time t.

Knowledge of the potential gives the driver simple information on the state of the system in question. The maximum and minimum possible values of the range of use of the system supplement this information and enable him to be continuously sufficiently informed of the possibilities of the system and thus of his vehicle.

According to a third preferential mode, the evaluation and display means calculate and display simultaneously:
- the range of use of the said system at the said given time t; and
- the maximum and minimum possible values of the range of use of the said system at the said given time t.

This third embodiment of a state indicator gives the driver complete information on the possibilities of the system in question. This information is highly summarized and is usually understood by the driver. In particular, he can follow the consequences of his driving choices and adapt them to his requirements.

The current and maximum and minimum possible usage range values are preferably shown graphically on a graduated scale.

The value of the current usage range can be represented by an index.

Advantageously, the area of the graduated range situated between the maximum and minimum possible values of the usage range is identified by a given color different from the background of the said range.

The maximum and minimum possible values of the range of use at the time t can advantageously be the minimum and maximum limits of the said graduated range.

The graduated range can also have a logarithmic scale of values. This has the advantage of focusing the attention of the driver on the small values at the end of life of the system.

It is also possible of course to add a digital display of the value of the potential of use of the system as well as the quantity C representing the severity of the parameters of use of the system at t.

In a complementary fashion, the state indicator according to the invention can also comprise means for:
- recording the range of use required by the driver at a given time; and
- updating this range of use required by the driver by deducting the distances actually traveled or the actual time of use, according to circumstances.

The evaluation and display means preferably compare the required range and the calculated range, and transform these data into a display recommending to the driver the behavior to be adopted in order to regain sufficient calculated range of use.

A person skilled in the art knows that this "range of use" is a function of the driving mode adopted by the driver. The range of use at time t reflects the current value of this range, which results from the past driving mode. It is obviously that, with regard to the future, the range of use will be affected by the driving mode adopted. The invention thus has the advantage of integrating this parameter into the state indicator: this involvement of the "driving mode" parameter has the great advantage of allowing the definition, at a time t, of the MINIMUM range of use (in the case of abrupt driving mode) and MAXIMUM range of use (in the case of flexible driving mode). The invention therefore affords for the first time direct information on the range of use AND information on the minimum and maximum accessible, and therefore an explicit recommendation on the driving mode for the driver.

A person skilled in the art will understand that the definition of the maximum and minimum ranges of use at time t will be obtained by means of measuring the driving parameters of the vehicle (instantaneous or average speed, instantaneous or average fuel consumption, instantaneous fuel range, internal tire pressure sensor, internal tire temperature sensor, voltmeter, ammeter, engine oil and water temperature, engine data such as cubic capacity, etc), measurements related to the conditions or parameters of use of the said vehicle and/or the physical characteristics of the said system and/or of the said vehicle and/or of the state of the said vehicle and/or the environment conditions for the said vehicle (temperature, rain etc), and calculation and evaluation by appropriate algorithms. These means will be either already present on the vehicle by virtue of the on-board electronics and the on-board control means which are becoming more and more numerous and even commonplace, such as ABS ESC (direction control), anti-skid, flat running systems such as the PAX System and associated sensors and electronics, etc, or will be developed specially. These means are within the capability of any person skilled in the art specializing in the technical sectors considered above, for example automobile engineer, on-board electronics specialist, data processing and similar specializations which are at the present time normal in the motor industry sector.

It is all these means which are designated "evaluation means".

In a preferential application, the system in question is a flat running system comprising at least for each wheel a tire casing, a deflation warning and means of supporting the tread of the tire casing in the case of deflation of the tire casing. These support means can be disposed in the structure of the tire casing; a "self-supporting" tire is then spoken of, that is to say this type of tire can continue to run at zero inflation pressure for a given distance whilst complying with a given maximum speed. The support means can also consist of a safety support intended to be disposed around the rim of the tire, radially externally, in order to be able to support the tread in the event of high loss of pressure. An example of such a flat running system with a safety support is the Michelin PAX system.

In this case, advantageously, the quantity C, representing the severity of the current conditions of use of the said system, is the temperature of the internal air of the said tire casing.

Patent application WO 02/07996 presents an example of a concrete calculation of the estimation of the range of a flat running system.

This method is such that, as from the time when the deflation warning has detected a predetermined deflation threshold:
  the distance traveled and a parameter C(t) characteristic of the running conditions are measured periodically;
  there is determined, as a function of C(t) and the distance measured on AΔ, a quantity characteristic of potential elementary damage to the system during the elapsed period Δt;
  an estimation of the total damage is calculated by combining the elementary damages calculated from the start of the flat running; and
  there is transmitted to the driver of the vehicle a quantity related to this estimation of the total damage to the flat running system.

According to a particular embodiment, from a series of running tests under conditions corresponding to those of the characteristic parameter C, a function is determined giving for any value of the parameter C an estimation e of the range of the new flat running system under running conditions. By way of example, it is possible to use the following function:

$$e(t)=e'_0(T_0-T)+e'_1$$

where:
  e is the modeled range, expressed in kilometers, which corresponds to the range available before immobilization of a flat running system running at a constant temperature T;
  T is the temperature of the internal air (in degrees Celsius);
  $T_o$ is an arbitrary reference temperature (in degrees Celsius);
  $e'_0$ is the slope of the linear relationship between the range and $(T_0-T)$, the difference between the maximum temperature and the measured temperature of the internal air;
  $e'_1$ is the estimated range at temperature $T_0$.

The potential elementary damage ΔJ during the running period Δt can be estimated by the ratio:

$$\Delta J=\Delta d/e(t)$$

in which Δd is equal to the distance traveled by the vehicle during the period Δt.

Considering J, the potential of use of the flat running system, at each measurement period Δt, the estimation of J(t) is updated by:

$$J(t)=J(t-\Delta t)-\Delta J$$

The estimation of E, the remaining range, can then be estimated by:

$$E=J(t)\times e(t)$$

The minimum and maximum values of the range of use at time t can then be very easily determined by taking into account the maximum and minimum values of the chosen characteristic value, for example, as in the previous example, the value of the air temperature in the internal cavity of the tire casing. The maximum acceptable value is then $T_0$. The minimum value, the value of the ambient temperature or another arbitrary value, such as 20 degrees Celsius.

Another object of the invention is an on-board monitoring and recommendation system such that it uses a state indicator according to the invention controlled by electronic memory means and logic circuits, in particular one or more algorithms, supplied with information coming from appropriate sensors.

The system according to the invention is advantageously such that it comprises a screen capable of successively displaying at least two "modes", that is to say at least two different display systems relating to different functionalities, chosen from amongst "fuel range", "tire wear range", "flat running system range", "range before revision", "battery range" mode and the like, with a priority display function for the faulty mode, the successive display being controlled at least partially by a control means activated by the driver or at least partially automatically controlled by the logic system and its memory.

The advantage of such a system is using the same display mode for different functionalities, which enables the user to know and understand it clearly. Thus, when a fault, for example with one of the tires, occurs and the flat running system of the tire concerned is implemented, the user will immediately understand and apply the recommendations transmitted by the indicator.

BRIEF DESCRIPTION OF THE DRAWINGS

Other characteristics and advantages of the invention will be understood more clearly from a reading of the description which follows, and with reference to the accompanying drawing, in which.

DETAILED DESCRIPTION OF PREFERRED EMBODIMENTS

Figure 1A:
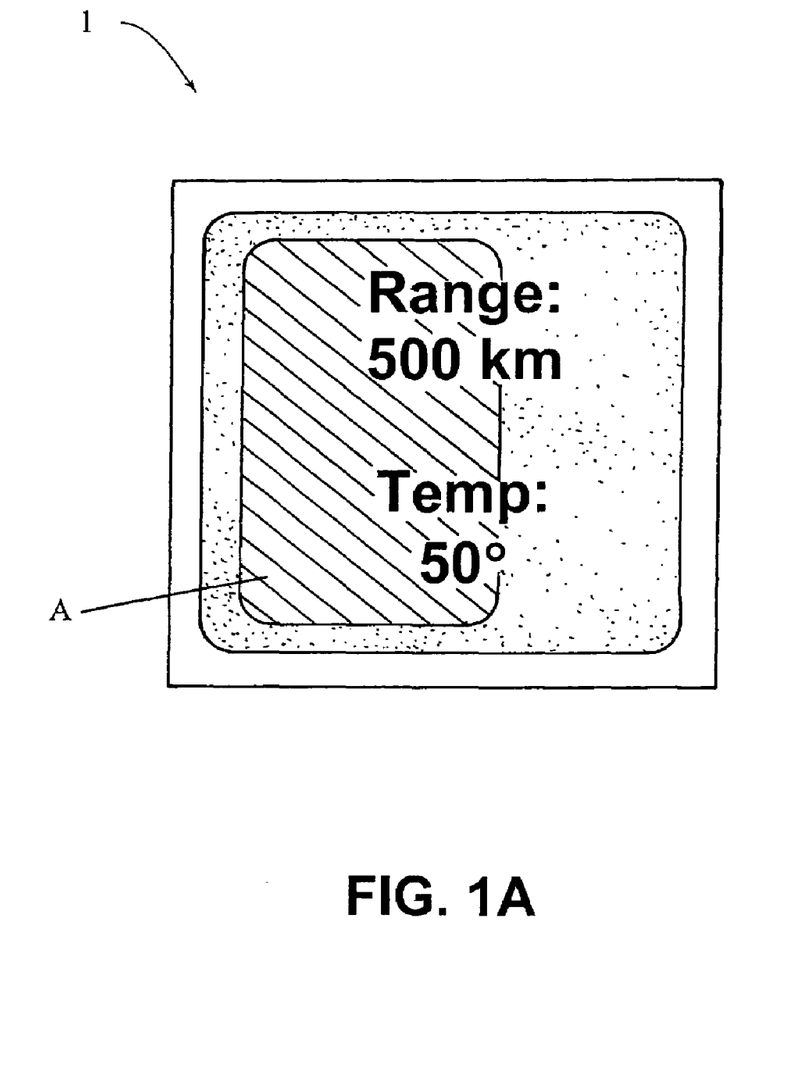
FIGS. 1A and 1B present a first embodiment of a state indicator according to the invention.
Figure 1B:
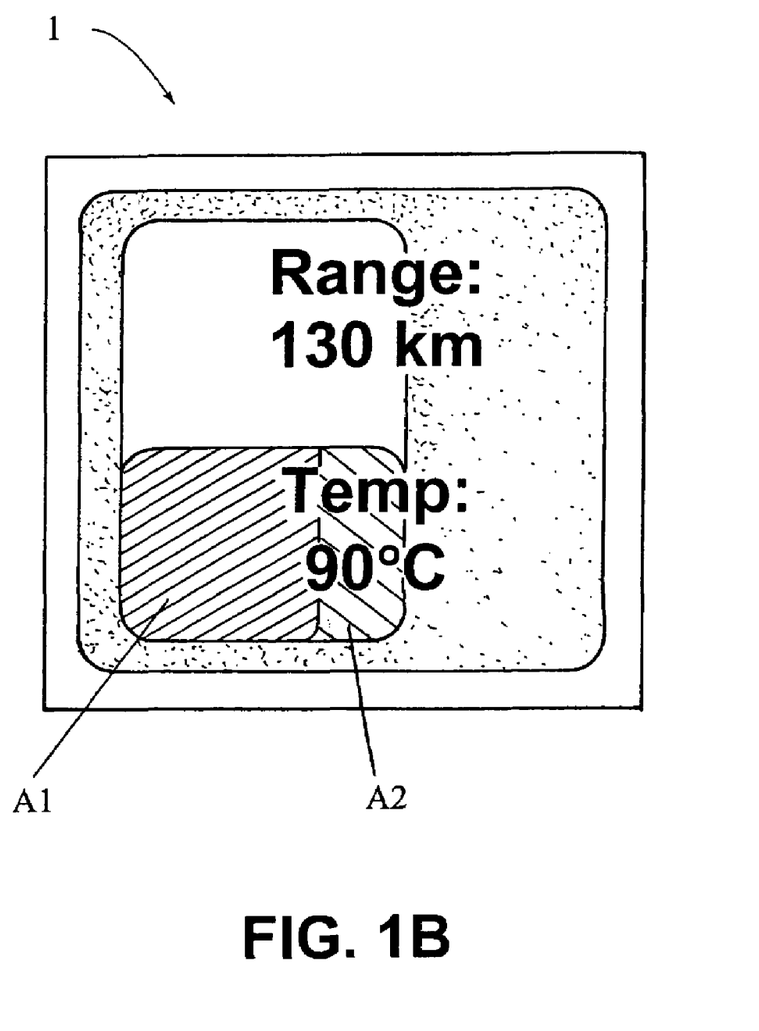

FIG. 1, which is composed of FIGS. 1A and 1B, depicts a non-limiting display screen 1 according to the invention, adapted to display the temperature of a tire in APL condition or flat running as well as the remaining range, that is the say the number of kilometers that the driver, at time t and under the driving conditions of this time, can travel without damaging or seriously degrading the tire. Such a display applies particularly to the PAX system.

It should be stated briefly that the PAX system consists essentially of a "support" made from material of the vulcanized rubber type or the like, mounted on a special rim profile. When a tire fails, the vehicle can continue to travel on the said "support", which prevents damage to the tire sidewalls and in particular shearing thereof. For reasons of overheating and the like, well known to specialists in flat running, it is necessary to limit the speed of the vehicle.

This system is now well known and a person skilled in the art can for more detail refer either to the commercial documents or as previously indicated to the patent application WO 02/07996; in this patent there will in particular be a found a method of calculating the estimation of the range of the flat running system, which can be used in the calculation algorithm of the system of the present invention.

The PAX system is therefore a highly representative example of a complex system, having an influence on maintaining safety, having a potential for use at time zero, allowing a certain range of use under certain limits of driving conditions, and which may prove to be not very effective or even inoperative if the driver is not informed of the driving conditions to be adopted, its range, and the influence of one of these parameters on the other. It is also an excellent example of a system whose importance is crucial when circumstances mean that it is used but which, with modern tires, will be used only very rarely: it is therefore a case of an example which is highly representative of the case where the information must be immediately understandable to any driver, even if the said driver has forgotten to consult the operating manual, or has forgotten the content thereof.

On the non-limiting example depicted in FIG. 1, referred to as the "tank gauge", it can be seen that the range in operation of a PAX system is represented at time zero by a large area A to the left of the screen, whose coloring can for example be green (a synonym of safety and therefore of satisfactory conditions). This area represents the potential of use of the PAX system. Throughout the use of the PAX system in flat running conditions, this area A will decrease and thus indicate the current state of the system to the driver. A graduation can be added, for example a relative graduation from 100 to 0 of this potential.

On the screen 1 the range, here 500 km, is also displayed numerically at the start of the flat running. It is also possible to add numerically the value of the temperature of the internal air of the tire, here 50 degrees Celsius. This temperature is in fact a quantity characteristic of the severity of the conditions of use of the system.

In FIG. 1B, after a certain time of flat running, it can be seen that the area A has greatly decreased in height and now corresponds substantially to a potential of 45%. The range calculated according to the potential and temperature as previously indicated is then 130 km. It can also be seen that the area A is divided into two areas A1 and A2 according to the value of the temperature of the internal air cavity. The temperature is here 90 degrees Celsius, which corresponds to relatively detrimental conditions of use of the system and, in order to indicate this to the driver clearly, it is possible to color in red the area A1, whose surface area will increase with the increase in temperature.

The functioning thereof is as follows: at the time of triggering of the PAX system, detected by a tire pressure sensor, which sends a signal to the on-board electronics, this means that the screen displays the potential and initial optimum range of the PAX system, for example 500 km, in the form of an integral green area, as well as the temperature of the tire at this moment, for example 50° C. (FIG. 1A); then the tire progressively heats up, and a tire pressure sensor supplies the said electronics, whose algorithm calculates (as previously indicated) the potential and range remaining at time t. On the screen, the algorithm creates and progressively reduces the height and surface area of the area A—the potential of the system—whilst the surface area of the area A1 relative to that of the area A2 corresponds to the temperature measured. The driver therefore intuitively understands the "threat", which is that the parameter to be monitored (the temperature) is assuming too great a magnitude, that its range is decreasing accordingly, and that he must therefore reduce his speed in order to reduce the temperature (the red area will decrease) and preserve an acceptable range. Naturally, the numerical values are displayed in real time, for example each minute.

Figure 2A:
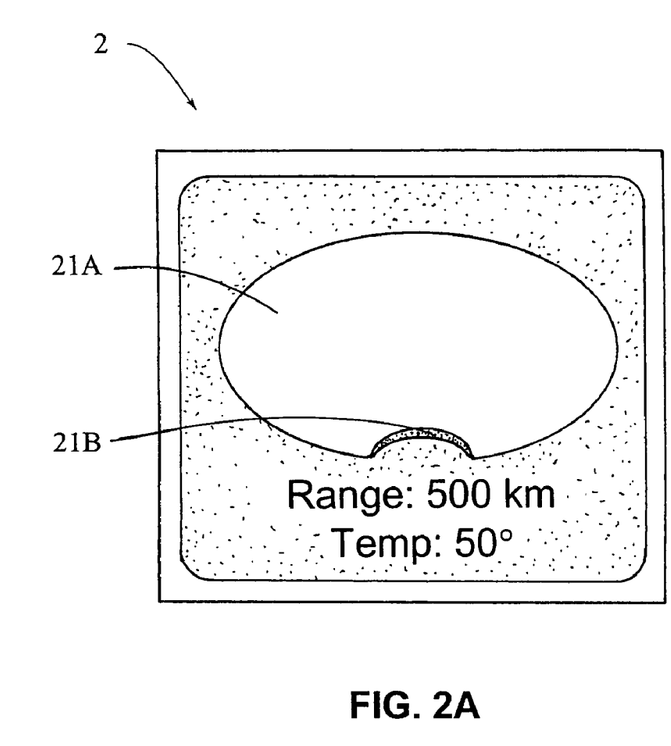
FIGS. 2A and 2B depict a graphical alternative to the above first embodiment.
Figure 2B:
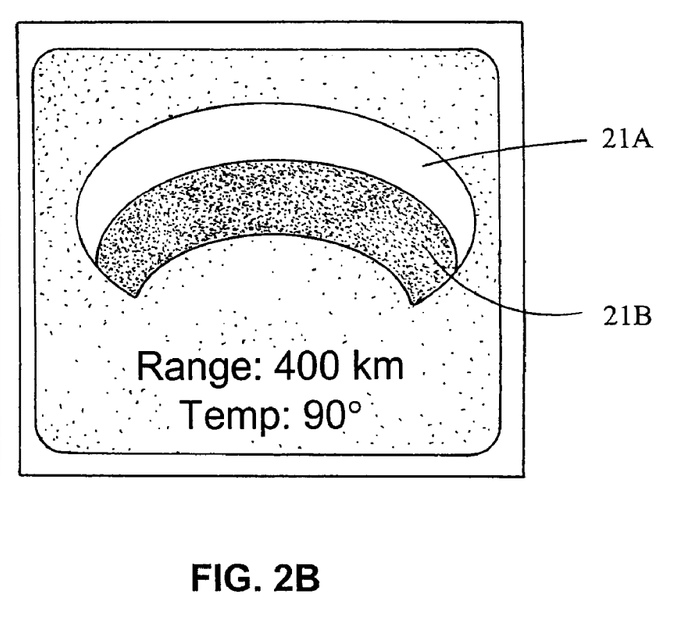

FIGS. 2A and 2B depict a variant 2 of the state indicator of FIG. 1, intended to illustrate the fact that a person skilled in the art can easily design visually different screens from the example in FIG. 1, without for all that departing from the scope of the invention. It can be seen here that the value of the potential is given by the progressive decrease of an elliptical area 21, white 21A and dark grey 21B; in parallel, a visual indication of the temperature, a quantity characteristic in the chosen example of the severity of the conditions of use, is given by the size of a dark grey area 21B relative to that of the elliptical area 21 of the potential. It can be seen in FIG. 2B that the dark grey area 21B extends over more than half of the elliptical area 21, which indicates a severe operating temperature. It is also possible, as before, to display numerically in superimposition the value of the range of use at time t of the system as well as the value of the temperature. In these two figures, the numerical values are identical to the previous ones.

Figure 3A:
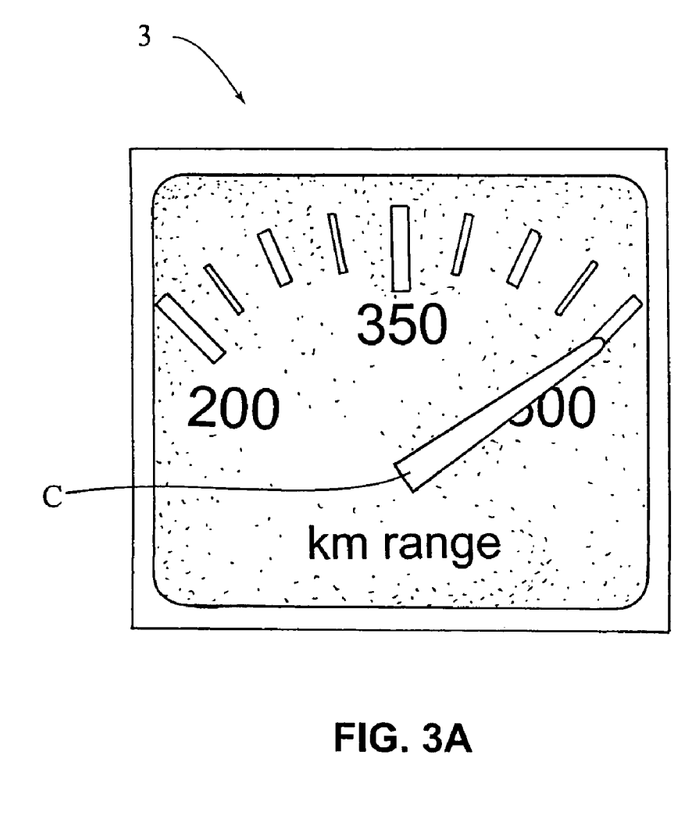
FIGS. 3A and 3B present a second embodiment of a state indicator according to the invention.
Figure 3B:
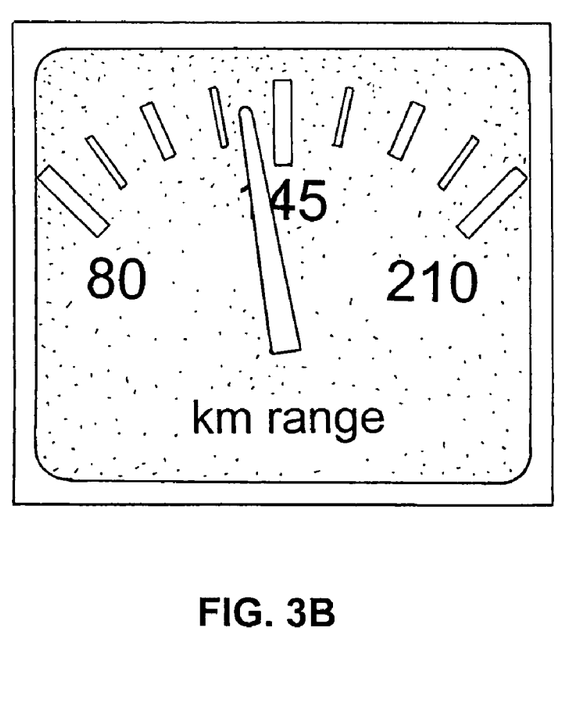

FIGS. 3A and 3B depict a non-limiting display screen 3 according to the invention, adapted to display, as parameters characteristic of the state of a system and its range, the range scale, the two minimum and maximum boundaries of which vary in real time, and a needle C representing the current range. This figure also corresponds to the case of a flat running system such as a PAX system.

It can be seen that, in FIG. 3A, the autonomy scale is from 200 to 500 km, with the value of the current range is equal to the maximum, that is to say 500 km. This figure corresponds as before to the start of flat running.

In FIG. 3B, after a certain time of flat running, the range scale possible is between 80 and 210 km and the current range under the current conditions of use is 130 km. The value of this range is marked by the needle C. It is also possible to add it numerically in superimposition in order to facilitate the understanding of the driver. The value of the temperature is here replaced by the display of the minimum and maximum possible range values calculated by the evaluation means of the system. These values are very advantageous for the driver, who immediately understands what journey is accessible to him under his current running conditions and what he must do in order to increase this range if necessary.

By way of option, it is also possible to display an alphanumeric message in superimposition or an alert pictogram of the end of life of the tire, that is to say the approach of the end of range.

Figure 5:
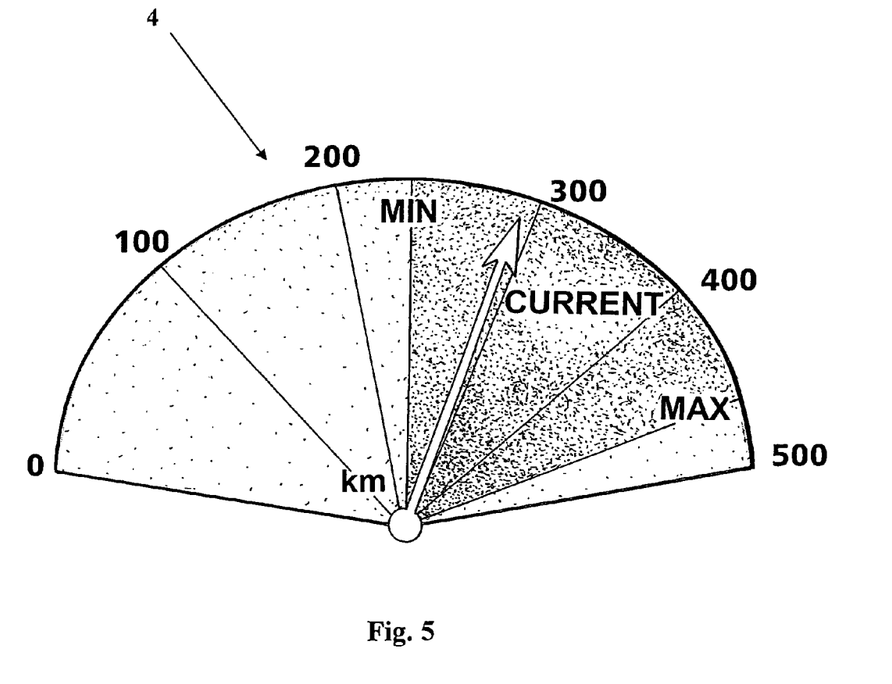
FIG. 5 presents an alternative to the indicator of FIG. 3.

FIG. 5 presents an embodiment close to that of FIG. 3. In the screen 4 in FIG. 5, the boundaries of the range scale are fixed and equal to 0 on one hand and 500 km on the other. 500 km being of course the maximum value of the initial range of the system.

The indication of the values at t of the maximum and minimum ranges is then given by a color scale which is darker than the rest of the screen. This dark color scale changes according to the data received from the system evaluation means. The value of the current range is given by a needle. It can also be confirmed by a numerical display in superimposition.

FIGS. 4A to 4H depict a non-limiting display screen 5 according to the invention adapted to display very clearly all the range parameters and driving recommendations.

Figure 4A:
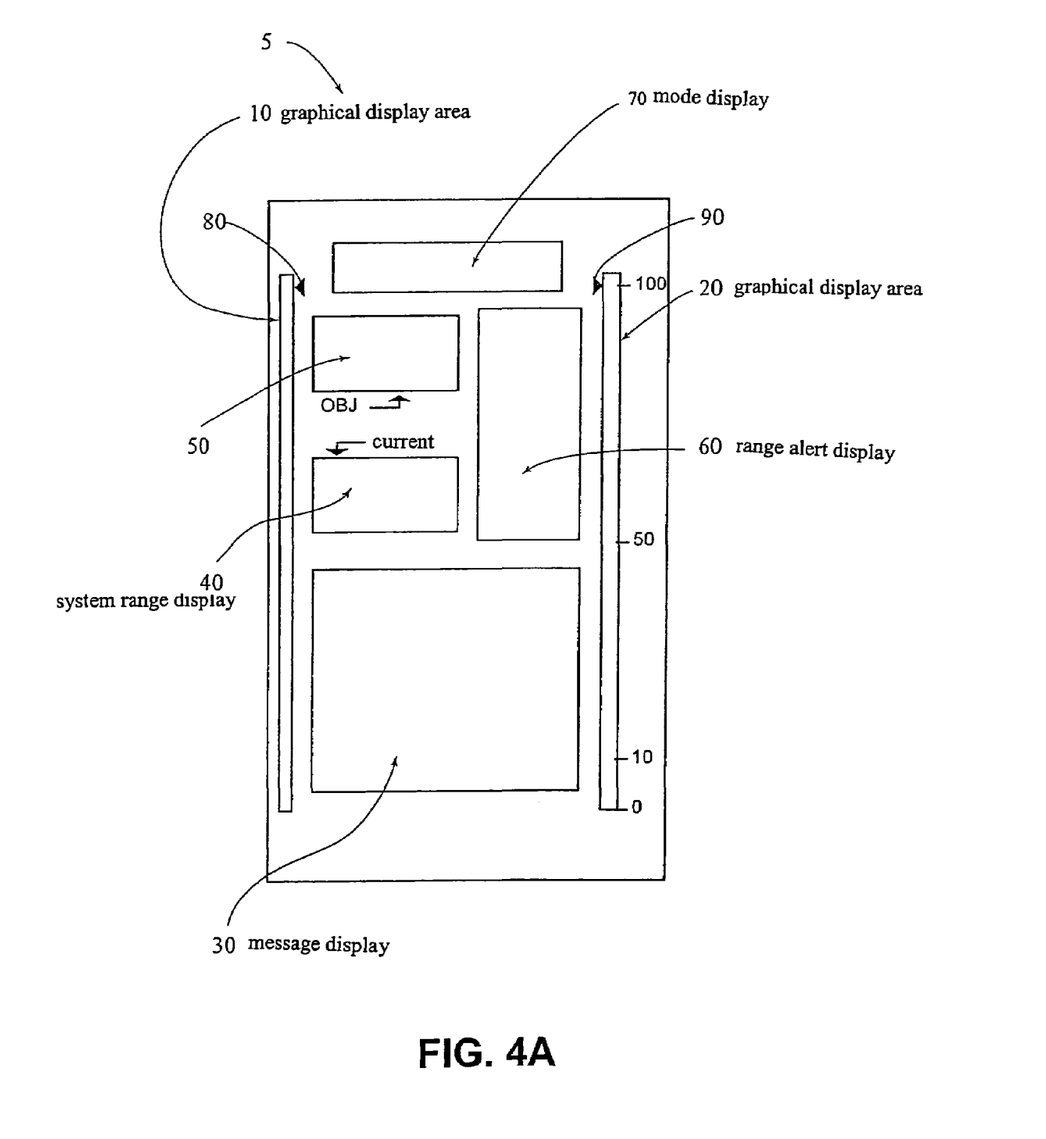
FIGS. 4A to 4H depict a state indicator presenting all the range and driving recommendation parameters.

FIG. 4A depicts the general scheme of the screen, which comprises a graphical display area 10 to the left of the system range parameters, a graphical display area 20 to the right of the "system potential", a message area 30, an area 40 displaying the range in clear and an objective area 50 to be achieved in terms of range, as well as a message or end of range alert pictogram area 60. There has also been provided a "display mode" area 70 which it would also have been possible to provide for the non-limiting examples depicted in FIGS. 1 to 3 and 5 and whose functioning will be described below.

In normal mode, this screen can display "normal mode" in the area 70 and display for example a speed average in the area 40, a driving time in the area 50, an "OK" pictogram in the area 60, and the time, the oil pressure or temperature, the average fuel consumption etc in the screen 30 reserved for messages. This normal case has not been depicted since it is easily understandable.

It will be understood that the essential data such as the instantaneous speed, which the driver must be able to consult at any moment, appear on a screen which is not shown.

The screen in the figure represents a screen of the on-board computer type, whose functions are invoked intentionally by the driver, or are displayed automatically in the event of failure of a component of the vehicle.

It will also be understood that it is possible to envisage adding areas in the screen of FIG. 4A, intended for these essential data, these areas remaining in all the display modes which will be described below. This solution is less preferred since the driver may for example forget to monitor his speed if this is "embedded" in the middle of various messages.

FIGS. 4B to 4F depict a mode of functioning in flat running mode of a PAX system.

Figure 4B:
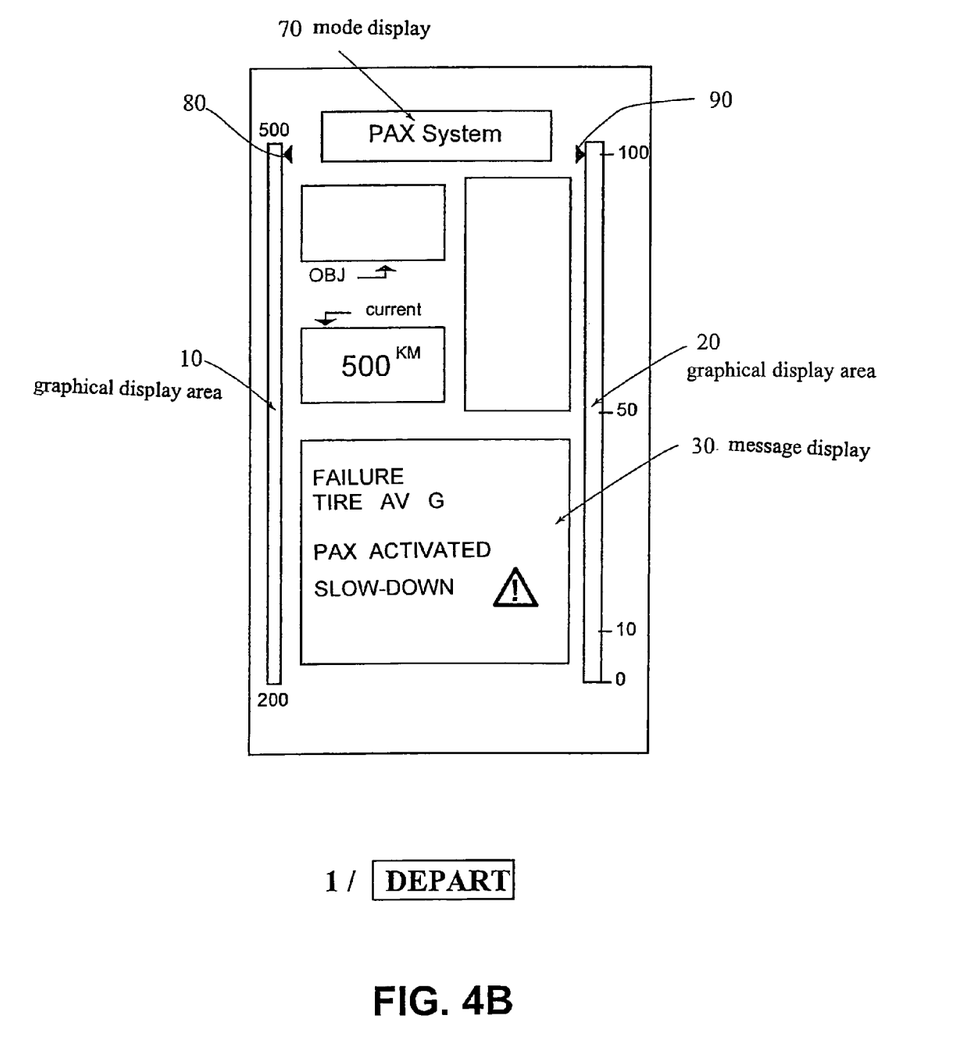

In FIG. 4B, the "normal" screen mentioned above is automatically replaced by the screen depicted in the said FIG. 4B, and which alerts the driver on a failure of a tire and the activation of the PAX system.

It can be seen that the area 70 displays "PAX System". The message area 30 specifies the failure and indicates in clear to the driver to slow down.

The "initial" range of the PAX (pre-recorded data from the manufacturer) is displayed automatically (here 500 km) as well as the range scale 200–500 on the area 10 to the left. At this initial time t=0, the index 80 of the cursor for the area 10 is positioned at the top of the area and indicates that the current range corresponds to the maximum range of the PAX system. This range display area corresponds entirely in its functioning to the screen 3 proposed in FIG. 3. The cursor 90 of the area 20 to the right indicates that the potential of the system is 100%.

The pictogram area 60 and the objective area 50 remain empty.

Figure 4C:
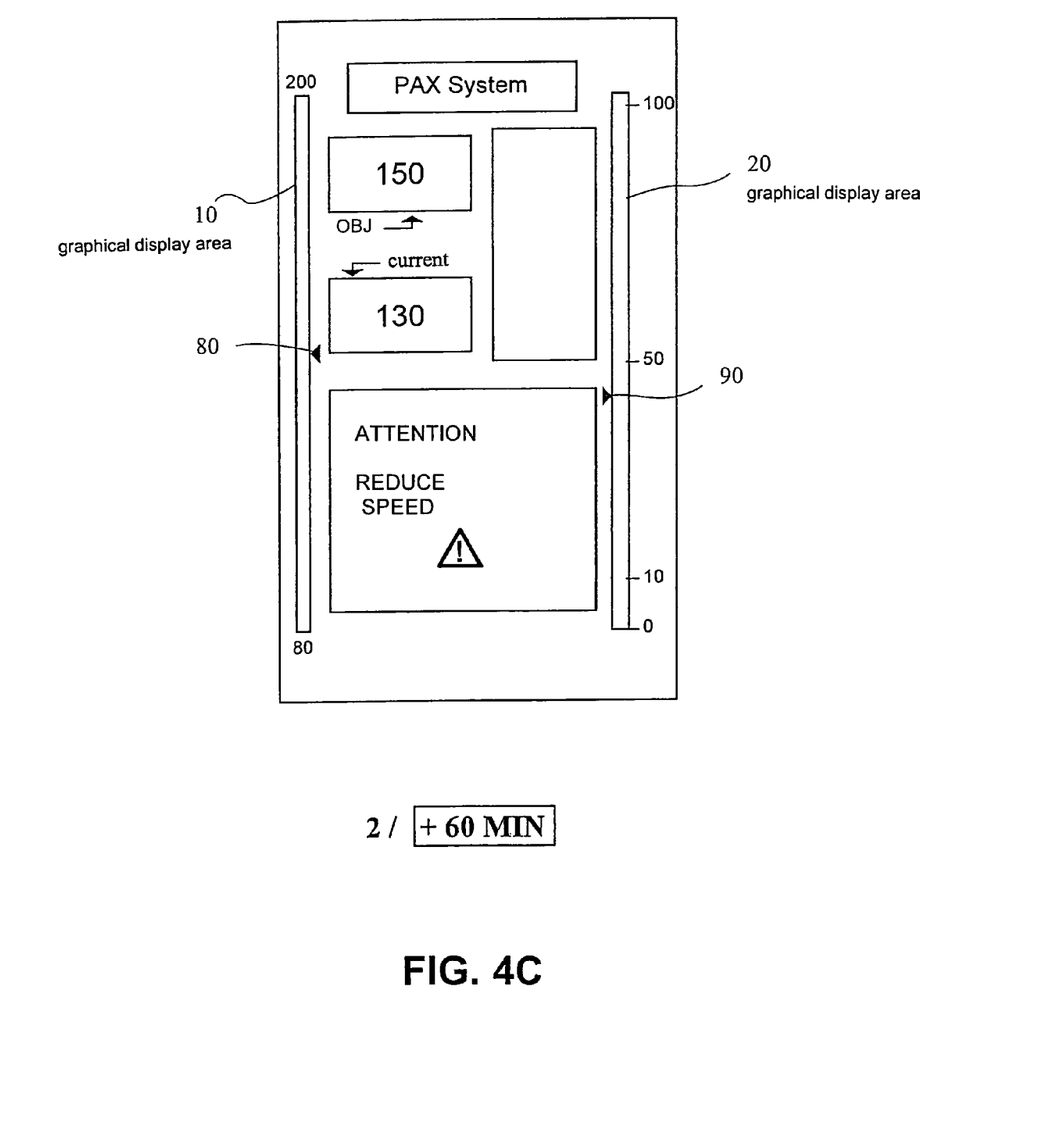

In FIG. 4C, which corresponds to an arbitrary time t=60 min, it can be seen that the driver has introduced an objective data into the area 50; for example, he has quickly introduced an objective of, for example, 220 km which he knows will enable him to reach such and such a garage and, at the end of 60 minutes, the objective has obviously been reduced to 150 km since the vehicle has moved closer to its objective. The objective is updated in real time by the on-board electronics according to the objective entered by the driver and the mileage covered.

The objective can be entered for example by a keypad of the car radio, or by the keypad of the on-board computer, or by voice entry etc.

It is also possible to enter the objective using GPS satellite positioning data or from any other positioning system, the entry then being able to be automated by a simple click on the destination town.

All this is within the immediate capability of any person skilled in the art specializing in on-board systems of this type.

The area displaying the range 10 then indicates as a maximum value of the range 200 km and minimum 80. The current range is indicated by the cursor 80 at 130 km. It is also displayed numerically in the area 40. The cursor 90 of the potential area 20 indicates a remaining potential of around 45% of the system.

It can be seen in FIG. 4C that the objective (updated as indicated above) is reduced to 150 km but that the updated range has fallen to 130 km. As indicated above, this updating of the range is carried out by the on-board electronics supplied in particular by a sensor for the tire temperature, possibly pressure, a vehicle speed sensor, or even an accelerometer making it possible to distinguish a "gentle" driving mode from an "aggressive" driving mode, the second merely contributing to reducing the range. These signals are integrated in an appropriate algorithm, the whole being within the capability of any person skilled in the art.

The lack of range of the system relative to the updated objective of the driver is indicated by an alert message in the area 30, possibly duplicated by an audible signal.

Various types of message are possible, one of them being able to clearly suggest to the driver that he should reduce his speed.

Figure 4D:
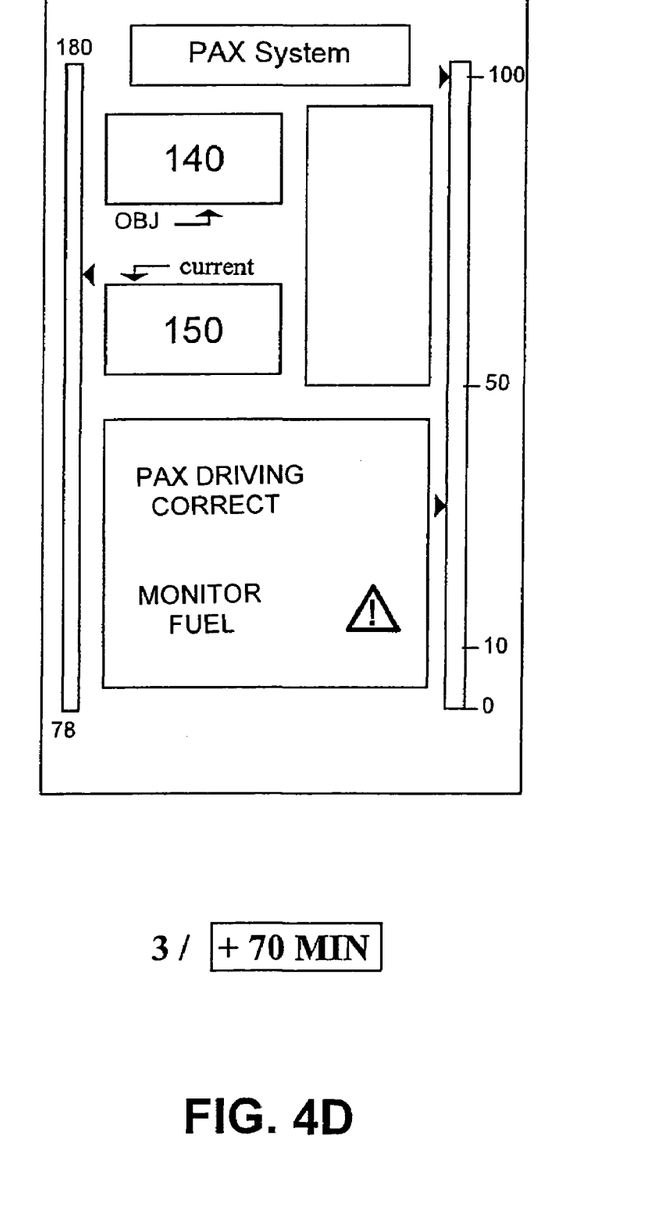

In FIG. 4D, at t=70 min, the driver has obeyed the warning in FIG. 4C and has greatly slowed his driving or made it more gentle. The electronics has recorded the favorable change in temperature of the tire, for example, and has calculated a new range. This has gone up to 150 km again whilst the objective has been approached (140 km). The objective can therefore be reached and the message displayed "PAX driving correct". The position of the cursor 80 in the area 10 has gone up again, which indeed confirms that the conditions of use of the system are substantially less severe.

However, the level of fuel has fallen to a limit value. The message scale 30 therefore indicates to the driver that he should monitor his gauge. The driver can then, by one of the commands of the on-board computer, scroll down the "modes" in the window 70 as far as the "fuel" mode (c.f. FIG. 4G). He can then return in the same way to "PAX" mode.

The information concerning the fuel whilst the PAX mode is displayed is a non-limiting example showing the extreme flexibility of the system, naturally non-limitingly.

Figure 4E:
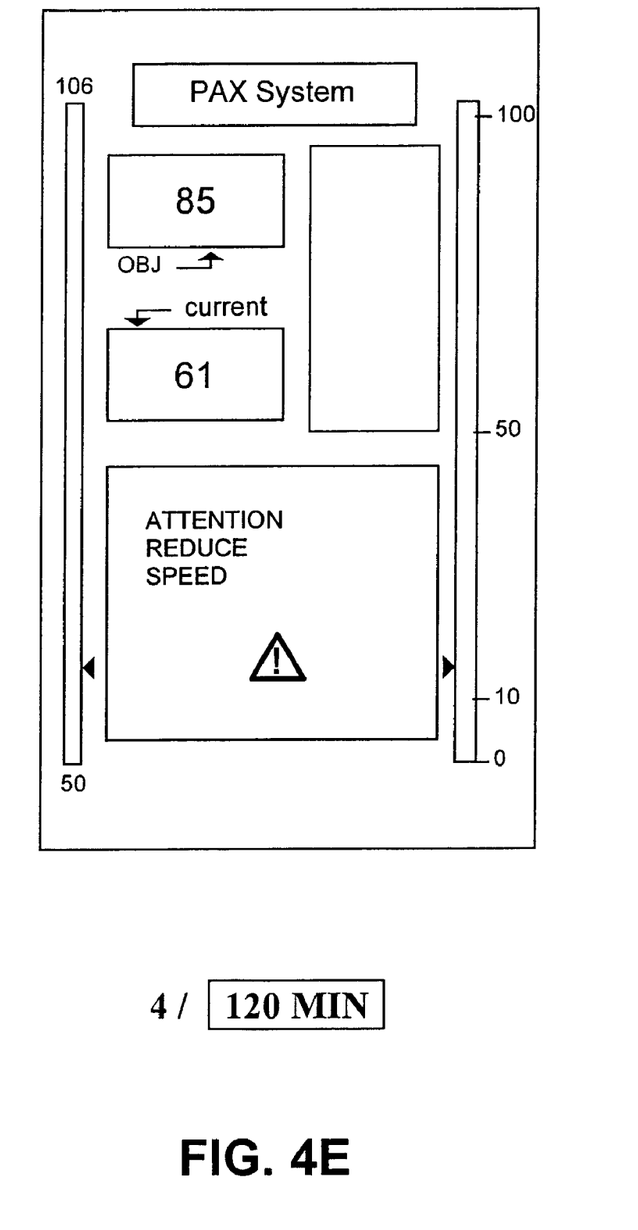

In FIG. 4E, t=120 min, it has been assumed that the driver has once again accelerated too much. Certainly the objective has come down to 85 km, but the range has fallen to an insufficient value to reach it, 61 km. The system once again displays a message suggesting that the speed should be reduced. The cursor 80 once again is very low in order to indicate that the conditions of use are very, excessively severe.

It can be seen that, naturally, in each figure, the range scale (the boundary values of the area 10) changes. Likewise in this FIG. 4E, the cursor of the area 20 indicates that the remaining potential of the system is very low, close to zero.

Figure 4F:
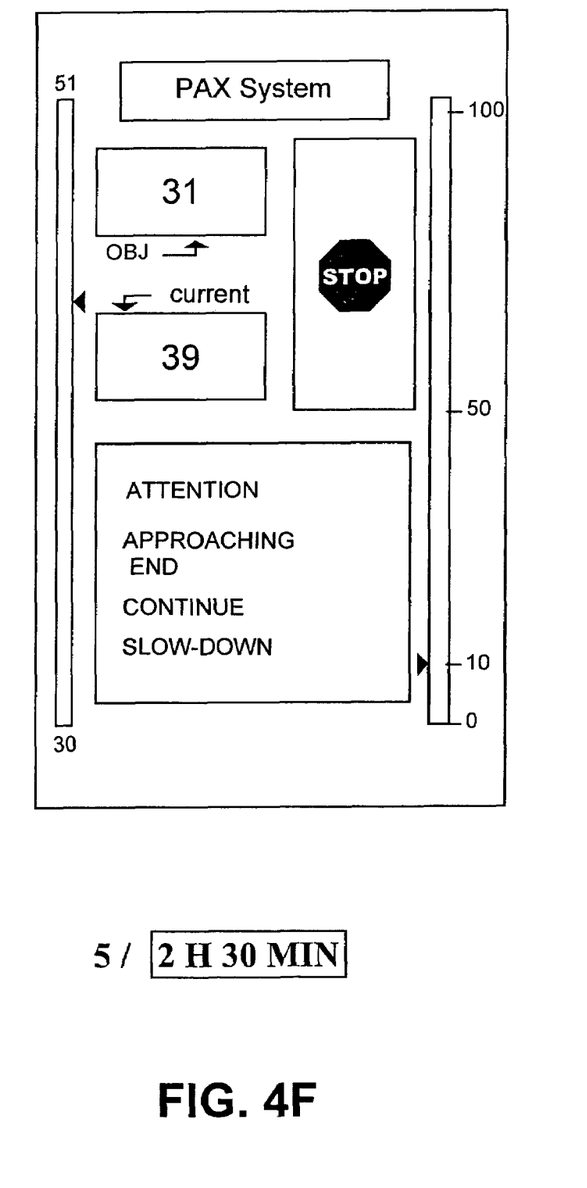
Figure 4G:
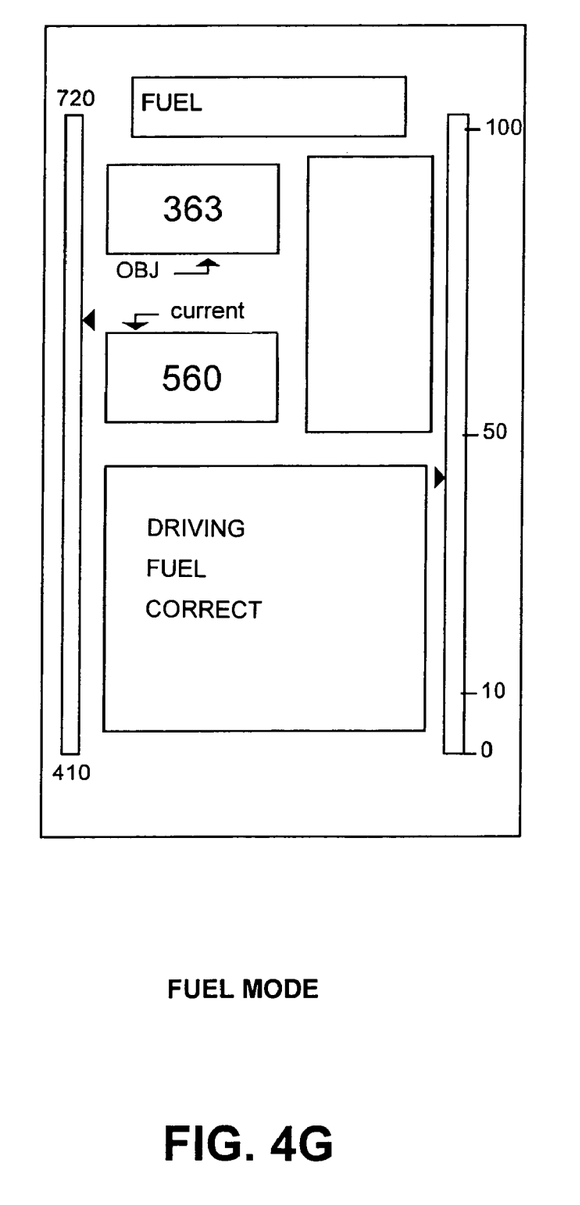

In FIG. 4F, t=150 min, the driver has once again slowed down. With a range of 39 km, he can achieve his objective, which has approached to 31 km.

However, provision has been made (pre-recorded data) to warn the driver when the range or potential fall to values below a certain threshold, that is to say at a moment when the driver MUST quickly find a garage. If this limit is for example 40 km and the range drops below this limit, an alert pictogram appears in the area 60 as well as preferably a message in clear in the area 30 (and this although the range is correct; it is a case of an independent warning).

Naturally, the above examples are all non-limiting. A person skilled in the art will understand that it is impossible to describe all the possible options or variants. The areas may be placed differently, be of different respective shapes or dimensions, the colors may be chosen at will, it is possible if necessary to eliminate certain areas, for example the pictogram, or on the contrary to add some.

It would have been possible for example in FIG. 4 to show the temperature of the tire either in a separate area or permanently in the message area.

FIG. 4G depicts the same screen in "fuel" mode. The same types of display are found (actual range and range scales, remaining potential, objective, etc). In the case of insufficient range, alert messages or pictograms would be displayed.

Figure 4H:
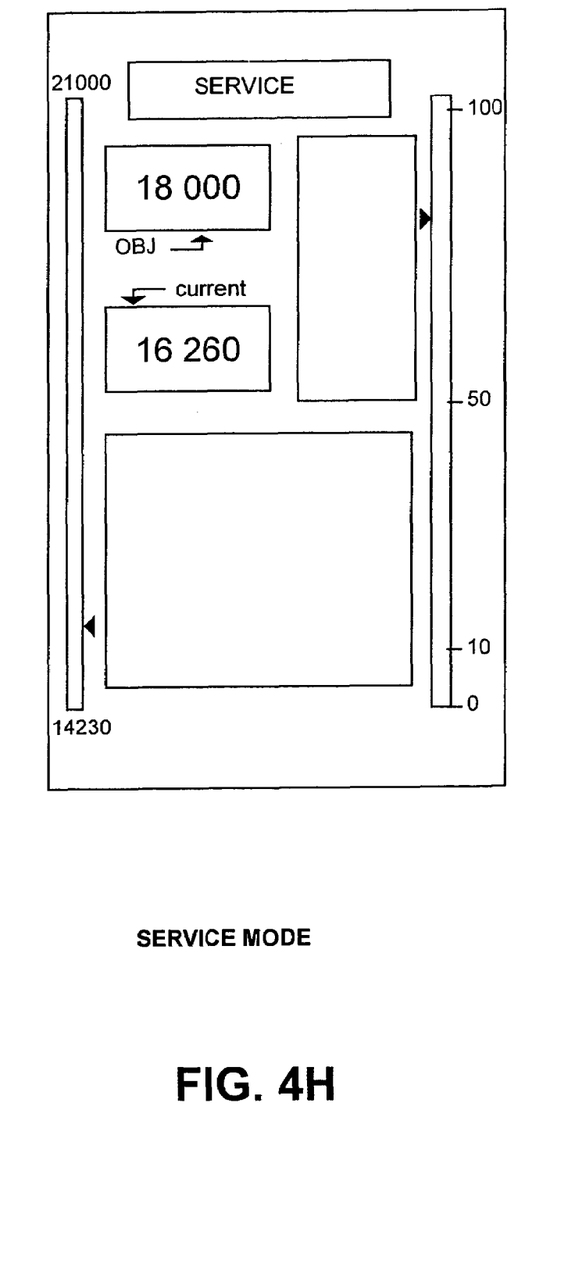

FIG. 4H depicts yet another display mode, which is the "service" mode. The standard (objective) is to have the vehicle serviced at 18,000 km (the manufacturer's standard). However, the conditions of use of the vehicle are more severe than those provided for by the manufacturer and the system calculates that, if these driving conditions are maintained, the service should take place at 16,260 rather than 18,000. Once again the advantage for the driver of a state indicator giving the values of range scales as well as the current range of the system can once again be seen. In particular, when the conditions of use are very gentle, the driver can without risk have his service carried out at values very appreciably greater than those (average) provided for by the manufacturer. Here, by way of example, the choice of less detrimental driving conditions may result in carrying out the service only at 21,000 km.

It is also possible to use the same principle and the same calculation and display means to monitor the wear on the tires and to advise the driver of their limit of use.

In general terms, the display means and the electronic systems or on-board systems according to the invention can be used to monitor in real time any function of the vehicle, or any component of the vehicle, whose development varies as a function (generally inverse) of the driving conditions adopted by the driver. It may be a case either of routine monitoring (fuel) or of monitoring of accidental circumstances (puncture and implementation of the PAX System for example).

The invention also covers all embodiments and applications which will be directly accessible to a person skilled in the art on reading of the present application, from his own knowledge, and possibly simple routine tests.

What is claimed is:

1. State indicator for a flat running system comprising at least, for each wheel, a tire casing, a deflation warning device and means for supporting a tread of the tire casing in the event of deflation of the tire casing, the system having a given use potential and comprising evaluation means such that, on the basis of measurements related to conditions of use of said vehicle and/or to physical characteristics of said system and/or to said vehicle and/or to environment conditions of said vehicle, said evaluation means calculate at a time t parameters characteristic of the state of said system, in which said state indicator simultaneously displays at said time t at least:

the potential for use of said system at said given time t;
the range of use of said system at said given time t; and
a quantity C related to the severity of the parameters of use of said system at said given time t.

2. Indicator according to claim 1, in which said potential ids displayed graphically.

3. Indicator according to claim 2, in which said potential is represented by an area A with a given color whose surface area represents the value of said potential.

4. Indicator according to claim 3, in which said area A is separated into two areas A1 and A2 whose respective surface areas are a function of the value of said quantity C.

5. Indicator according to claim 1, in which said quantity C is displayed graphically.

6. Indicator according to claim 5, in which the value of the quantity C related to the severity of the current conditions of use of said vehicle is in addition displayed numerically.

7. State indicator according to claim 1, such that it comprises means for:

Recording the range of use required by the driver at a given time; and
Updating this range of use required by the driver by deducting the distances actually traveled or the actual time of use, according to circumstances.

8. Indicator according to claim 7, in which the evaluation and display means compare the required range and the calculated range, and convert these data into a display recommending to the driver the behavior to be adopted in order to regain a sufficient calculated range of use.

9. Indicator according to claim 1, in which the quantity C, representing the severity of the current conditions of use of said system, is the temperature of the internal air of the tire casing.

10. On-board "monitoring and recommendation" system, characterized in that it uses at least one state indicator according to claim 1, controlled by electronic memory and logic circuit means, in particular one or more algorithms, supplied with information coming from appropriate sensors.

11. System according to claim 10, such that it comprises a screen capable of successively displaying at least two "modes" in the form of at least two different respective functionalities, chosen from amongst "fuel range", "tire wear range", "flat running system range", "range before service", "battery range" modes, with a function of priority display of a failed mode, the successive display being controlled at least partially by a control means activated by the driver or at least partially controlled automatically by a logic system and its memory.

12. Indicator according to claim 1, wherein said state indicator moreover simultaneously displays the maximum and minimum values of the range of use of said system at said given time t.

13. Indicator according to claim 12 such that the maximum and minimum values of the range of use of said system at said time t are evaluated by integrating the use potential with said given time t.

14. Indicator according to claim 12, such that the maximum and minimum possible values of the range of use of said system at said time t are evaluated by integrating the vehicle driving parameters.

15. Indicator according to claim 12, in which the maximum and minimum possible values of the range of use of said system at the time t are evaluated by integrating the vehicle environment parameters.

* * * * *